US009228871B2

(12) United States Patent
Arnold et al.

(10) Patent No.: US 9,228,871 B2
(45) Date of Patent: Jan. 5, 2016

(54) METHOD FOR OPERATING A THERMAL, FLOW MEASURING DEVICE

(75) Inventors: Martin Arnold, Reinach (CH); Michel Wagner, Birsfelden (CH)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 282 days.

(21) Appl. No.: 13/996,254

(22) PCT Filed: Nov. 23, 2011

(86) PCT No.: PCT/EP2011/070853

§ 371 (c)(1), (2), (4) Date: Jun. 20, 2013

(87) PCT Pub. No.: WO2012/084396

PCT Pub. Date: Jun. 28, 2012

(65) Prior Publication Data

US 2013/0283904 A1 Oct. 31, 2013

(30) Foreign Application Priority Data

Dec. 23, 2010 (DE) ......................... 10 2010 064 127

(51) Int. Cl.
*G01F 1/68* (2006.01)
*G01F 1/69* (2006.01)
(Continued)

(52) U.S. Cl.
CPC *G01F 1/69* (2013.01); *G01F 1/696* (2013.01); *G01F 1/698* (2013.01)

(58) Field of Classification Search
CPC ......... G01F 1/69; G01F 1/6847; G01F 1/684; G01N 25/04; G01K 17/00
USPC .................... 73/204.11, 204.25, 204.23, 861, 73/114.34, 152.23, 198, 202.5, 861.95; 374/24, 29
See application file for complete search history.

(56) References Cited

U.S. PATENT DOCUMENTS 3,603,147 A 9/1971 Dorman
4,753,111 A 6/1988 Caron et al.
(Continued)

FOREIGN PATENT DOCUMENTS

DE 199 48 135 A1 4/2001
DE 10 2007 050 792 A1 5/2008
WO 2007/063111 A2 6/2007

OTHER PUBLICATIONS

Flowtec, Device for determinng and/or monitoring the mass flow of a fluid medium, WO 2007063111A2.*

(Continued)

*Primary Examiner* — Lisa Caputo
*Assistant Examiner* — Nigel Plumb
(74) *Attorney, Agent, or Firm* — Bacon & Thomas, PLLC

(57) ABSTRACT

A thermal, flow measuring device and method for measuring the flow of a measured medium. During a heating phase of predetermined length a constant heating current of a first electrical current source flows through a first resistor. During a first measuring phase of predetermined length a constant measurement current of a second electrical current source flows through the first resistor. During the first measuring phase a first voltage falls across the first resistor, wherein during a second measuring phase of predetermined length during the first measuring cycle the constant measurement current of the second electrical current source flows through a second resistor. During the second measuring phase a second voltage falls across the second resistor, wherein during the heating phase the constant heating current of the first electrical current source flows through a shunt resistor, wherein during the heating phase a fifth voltage falls across the shunt resistor, wherein at least the first voltage, the second voltage and the fifth voltage are utilized for calculating the flow and wherein during the first measuring phase the constant heating current of the first electrical current source flows through a bypass resistor.

8 Claims, 5 Drawing Sheets

(51) Int. Cl.
*G01F 1/696* (2006.01)
*G01F 1/698* (2006.01)

(56) References Cited

U.S. PATENT DOCUMENTS

| | | | | |
|---|---|---|---|---|
| 6,230,560 | B1 | 5/2001 | Suzuki | |
| 7,205,781 | B2 * | 4/2007 | Maslovich | G01F 1/698 324/610 |
| 2010/0147068 | A1 * | 6/2010 | Neuhaus | G01F 1/68 73/204.11 |
| 2010/0285571 | A1 * | 11/2010 | Coursey | G01K 7/20 435/286.1 |

OTHER PUBLICATIONS

Flowtec, Device for determing and/or monitoring the mass flow of a fluid medium, WO 2007063111.*

German Search Report dated Jul. 21, 2011, issued in Application No. 10 2010 064 127.8, in Munich, Germany.

International Preliminary Report on Patentability dated Apr. 19, 2012, issued in Application No. PCT/EP2011/070853, in Rijswijk, the Netherlands.

International Preliminary Report on Patentability dated Jul. 4, 2013, issued in Application No. PCT/EP2011/070853, in Geneva, Switzerland.

* cited by examiner

METHOD FOR OPERATING A THERMAL, FLOW MEASURING DEVICE

TECHNICAL FIELD

The present invention relates to a thermal, flow measuring device and to a method for operating a thermal, flow measuring device for measuring the flow of a measured medium through a measuring tube, wherein during a heating phase of predetermined length during a first measuring cycle a constant heating current of a first electrical current source flows through a first resistor, which is exposed to the measured medium, wherein during a first measuring phase of predetermined length during the first measuring cycle a constant measurement current of a second electrical current source flows through the first resistor, wherein during the first measuring phase a first voltage falls across the first resistor, wherein during a second measuring phase of predetermined length during the first measuring cycle the constant measurement current of the second electrical current source flows through a second resistor, which is exposed to the measured medium, wherein during the second measuring phase a second voltage falls across the second resistor.

BACKGROUND DISCUSSION

Known from the state of the art are temperature sensors for industrial process technology. Their construction is similar to that of thermal, flow measuring devices, with the difference that conventional thermal, flow measuring devices usually use two temperature sensors, which are embodied as equally as possible and which are arranged, most often, in pin-shaped, metal sleeves, so-called stingers or prongs, which are in thermal contact with the medium flowing through a measuring tube or through the pipeline. Most often, they are immersed in the medium. For industrial application, the two temperature sensors are usually installed in a measuring tube. The temperature sensors can, however, also be mounted directly in the pipeline. One of the two temperature sensors is a so-called active temperature sensor, which is heated by means of a heating unit. The heating unit is either an additional resistance heater, or, when the temperature sensor itself is a resistance element, e.g. an RTD—(Resistance Temperature device) sensor, it is heated by conversion of electrical power, e.g. by a corresponding variation of the heating current. The second temperature sensor is a so-called passive temperature sensor: It measures the temperature of the medium with an as small as possible self-warming by the measurement current.

Until now, mainly RID-elements with helically wound platinum wires have been applied in thermal, flow measuring devices. In the case of thin-film, resistance thermometers (TF-RTDs), conventionally, a meander-shaped, platinum layer is vapor deposited on a substrate. In addition, another, glass layer is applied for protecting the platinum layer. The cross section of the thin-film-resistance thermometer is rectangular, in contrast with the RTD-elements having a round cross section. The heat transfer into the resistance element and/or from the resistance element occurs accordingly via two oppositely lying surfaces, which together make up a large part of the total surface area of a thin-film-resistance thermometer.

Known from U.S. Pat. No. 6,230,560 is a thermal, flow measuring device having two resistors, which are exposed to the flow of the measured medium through a measuring tube. Common to all forms of embodiment is that the two resistors are heated with a heating current and that the temperature of the measured medium is measured with a third resistor. The calculating of the flow of the measured medium through the measuring tube occurs, in such case, by means of the temperatures of the two heated resistors calculated from their resistances and the temperature of the third resistance. The two heated resistors are continuously heated by means of a constant electrical current source. From $R=U/I$ with the heating current I and the measured voltage drop U across the heated resistor, its resistance R can be determined. By means of $R=R_0+(1+\alpha\Delta T)$ there results its temperature $T=\Delta T+T_G$, with $T_G$ being the temperature of the third, unheated resistor.

There is, however, provided, in one form of embodiment, a voltage source for supplying the heated resistors with the heating current. Then, auxiliary resistors are connected in series with the heated resistors. The resistance of the auxiliary resistors is not changed by the heating current—their resistance is essentially temperature independent. Additionally, electrical current measuring devices are provided, which measure the current heating current via the auxiliary resistors. This is then utilized in calculating the temperatures of the heated resistors, such as already described above.

Disadvantageous is the application of at least three resistors, two heated and one unheated, which are so arranged relative to the lumen of the measuring tube that they are in good thermal contact with the measured medium, in order to measure the flow of the measured medium in the measuring tube.

International published application, WO 2007/063111 A2 discloses a circuit of a thermal, flow measuring device, wherein first and second resistors are arranged in the lumen of the measuring tube. The circuit includes, furthermore, a first electrical current source and a second electrical current source. The first electrical current source delivers a heating current, and the second electrical current source produces a measurement voltage via the resistors. At least one switch between the first resistor and the electrical current sources controls the supplying of the first resistor with the heating current or with the measurement current, in that it connects the first resistor in series either with the first electrical current source or with the second electrical current source. If only the first resistor is heated, then the second resistor is connected via a switch at least at times in series with the second electrical current source. If both resistors are heated, then what has been outlined for the first resistor holds also for the second resistor.

The first resistor is, in such case, heated with a constant amount of heat. The supply of the constant amount of heat is controlled by means of the switch, which switches the first and/or the second resistor in series with the first electrical current source. Disadvantageous in the case of this apparatus is that the first electrical current source does not provide a constant electrical current. It is, instead, a voltage source with constant voltage. The heating power to the first resistor depends, thus, strongly on the length of the heating phase. It is calculated from $P=(t_h/T_1)*(U^2/R)$, using the voltage U, the resistance value R, the heating period length to and the measuring period duration $T_1$.

SUMMARY OF THE INVENTION

An object of the invention is to provide a thermal, flow measuring device, which is simply constructed and measures highly accurately.

The object is achieved by a thermal, flow measuring device for measuring the flow of a measured medium through a measuring tube, comprising: a first electrical current source; a second electrical current source; an electrical circuit, which has a first resistor and a second resistor, each of which is arranged in a housing bordering the lumen of the measuring tube, and at least one switch, which is switchable such that, in a first switch position, said first resistor is connected in series with said first electrical current source, in a second switch position, said first resistor is connected in series with said second electrical current source, and, in a third switch position, said second resistor is connected in series with said second electrical current source, wherein: in said first switch position, a shunt resistor is connected in series with said first resistor and with said first electrical current source for measuring a voltage drop across said shunt resistor, and in said second switch position, a bypass resistor is connected in series with said first electrical current source.

BRIEF DESCRIPTION OF THE DRAWINGS

The invention permits numerous forms of embodiment. Some thereof will now be explained in greater detail based on the figures of the appended drawing. Equal elements are provided in the figures with equal reference characters. The figures of the drawing show as follows.

DETAILED DISCUSSION IN CONJUNCTION WITH THE DRAWINGS

Figure 1:
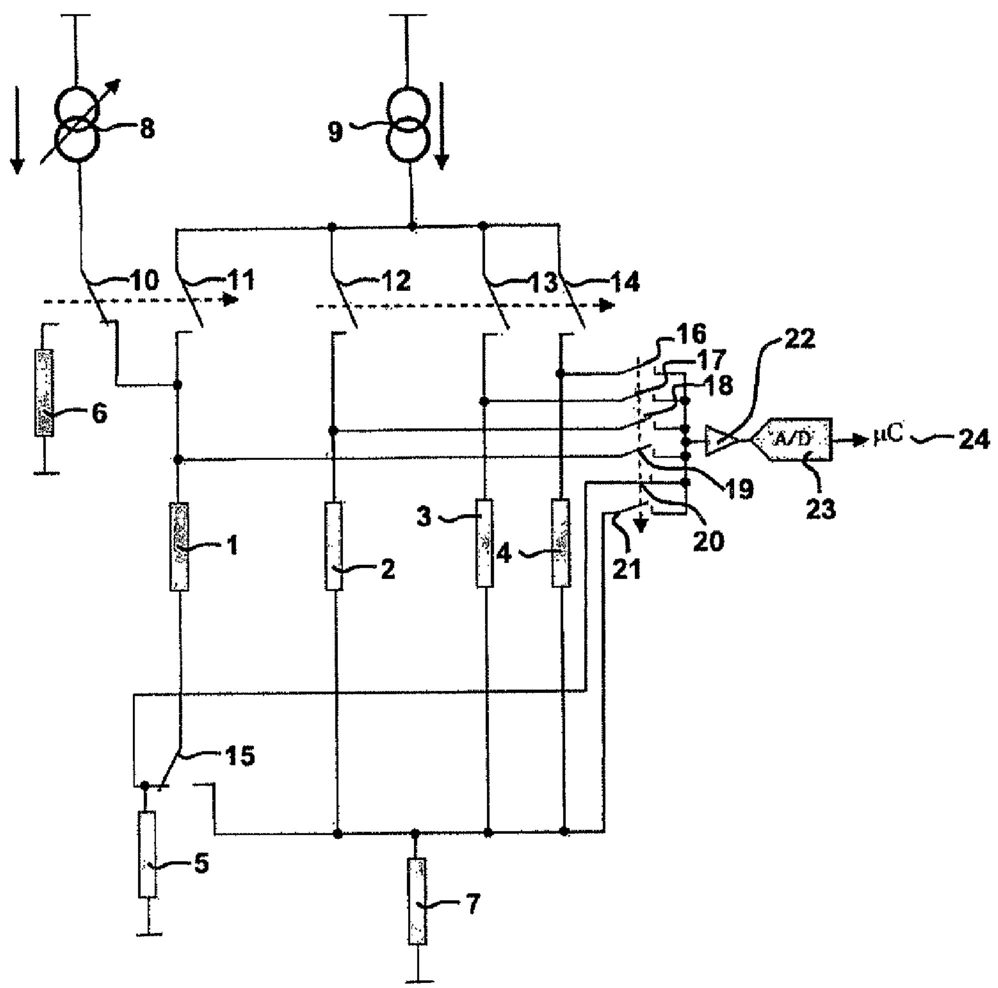
FIG. 1 is a circuit diagram of a thermal, flow measuring device of the invention.
Figure 2:
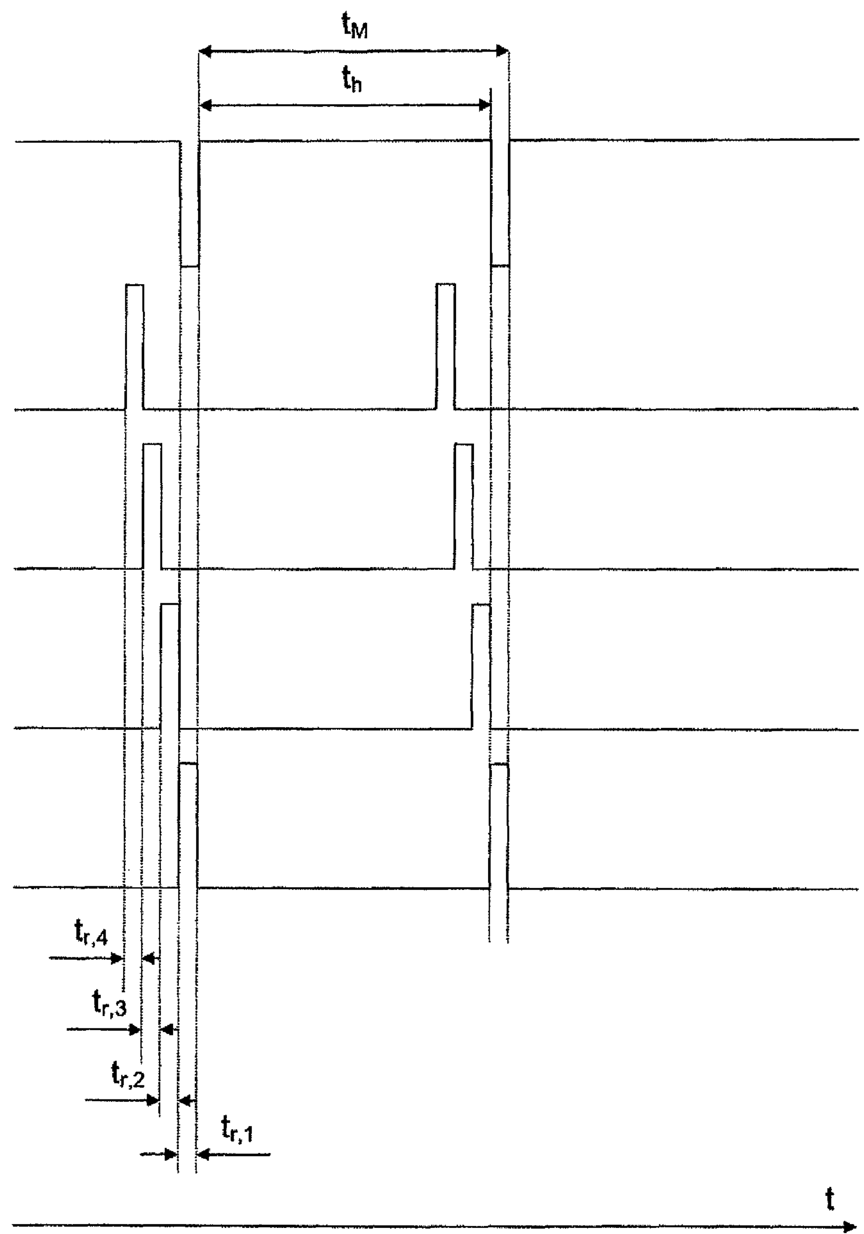
FIG. 2 is a timing diagram illustrating the method of the invention with the circuit according to FIG. 1.

FIG. 1 shows an equivalent block diagram of a circuit of a thermal, flow measuring device of the invention for measuring the flow of a measured medium through a measuring tube. A timing diagram for performing the method of the invention with the described circuit is illustrated in FIG. 2. Thus, the operation of the circuit of FIG. 1 will be presented in conjunction with the timing diagram of FIG. 2. FIG. 2 shows schematically the phases, in which electrical currents flow through individual components of the circuit. The vertical heights of the currents in FIG. 2 do not correlate with the actual electrical current levels. FIG. 2 is intended only to show the switching times and the sequential course of the method.

The circuit of FIG. 1 includes a first resistor 1 and a second resistor 2, each of which is arranged in a housing bordering the lumen of the measuring tube. In such case, in one variant, each of the two resistors 1 and 2 is arranged in its own housing, e.g. the metal sleeves described in the state of the art. In another variant, the two resistors 1 and 2 are arranged in a shared housing. The two resistors 1 and 2 are in both cases exposed indirectly to the flow of the measured medium in the measuring tube.

The circuit includes furthermore a first switch 10. The first switch connects in a first switch position (illustrated here with a solid line) the first resistor 1 with a first electrical current source 8. In the first switch position, the first resistor is connected in series with a first electrical current source. During a measuring cycle $t_M$, this happens during a heating phase $t_h$. The first electrical current source 8 is, in such case, controllable, especially software driven. However, it delivers a constant heating current $U_h$ during a heating phase $t_h$.

Besides the first switch 10, the circuit includes other switches 11, 12, 13, 14 and 15, and switches 16, 17, 18, 19, 20 and 21. The switches 16, 17, 18, 19, 20 and 21 can be individual switches or the switches of a mufti-switch or multiplexer, such as shown here.

The switches 11, 12, 13 and 14 are open in the here illustrated, first switch position, i.e. a second electrical current source is not connected with the resistors 1, 2, 3 and 4. The sixth switch 15 in the first switch position (illustrated here with the solid line) connects the first resistor 1 and a shunt resistor 5 in series. Thus, in the first switch position, the first electrical current source 8 is connected in series with the first resistor 1 and the shunt resistor 5. The shunt resistor 5 is connected at its other end with a reference potential, for example, with the ground potential.

Also the switches 16, 17, 18, 19 and 21 of the multiplexer are open in the first switch position. Only switch 20 is closed during the entire heating phase $t_h$, in order to supply a fifth voltage $U_{h,5}$, which during the heating phase $t_h$ in at least the first switch position fails across the shunt resistor 5, to signal processing elements 22, 23 and 24 connected after the switch 20, in order that the fifth voltage $U_{h,5}$ can be processed further. The voltage $U_{h,5}$ is a measure for the heating current $I_h$ flowing through the first resistor 1. The shunt resistor 5, also called an electrical current measuring resistor, usually has a small resistance value. It is essentially temperature independent. Moreover, it can be arranged in a housing thermally insulated from the surrounding environment and especially thermally insulated from the measured medium and/or it is, for example, likewise highly precise.

Thus there flows during the heating phase to during a first measuring cycle the constant heating current $I_h$ of the first electrical current source 8 through the first resistor 1 and the fifth voltage $U_{h,5}$ falls across the shunt resistor 5.

During a first measuring phase $t_{r,1}$, the first switch 10 is moved into a second switch position. In this case, the first resistor 1 is isolated from the first electrical current source 8 and the first electrical current source 8 is then directly connected with a bypass resistor 6. The bypass resistor 6 has, in such case, a resistance value, which essentially corresponds to that of a first measuring path composed of first resistor 1, shunt resistor 5 and the therebetween lying switches 11 and 15, at least in the case of an average expected temperature and therewith an average resistance value of the first resistance 1. By switching the first electrical current source 8 from the first resistor 1 to the bypass resistor 6, the heating current $I_h$ is diverted to the bypass resistor 6 and the first electrical current source 8 experiences no significant load jump. This shortens the settling time of the first electrical current source 8 in the case of switching the first switch 10 and additionally reduces over-, or undershooting during the settling time. This results in an improved accuracy of measurement of the heating current $I_h$ and therewith the ascertaining of the flow of the measured medium through the measuring tube.

In the second switch position, the second switch 11 is closed. The first and the second switches 10 and 11 are switched here simultaneously. Thus, the second electrical current source 9 is connected in series with the first resistor 1. During the first measuring phase $t_{r,1}$ of the first measuring cycle, a constant measurement current $I_m$ flows from the second electrical current source 9 through the first resistor 1 and there falls across the first resistor a first voltage $U_{r,1}$. This is fed to the signal processing elements 22, 23 and 24 by moving the sixth switch 15 to its second position and closing the switches 19 and 21. Switch 20 closed in the heating phase $t_h$ is open in the second switch position during the first measuring phase $t_{r,1}$. Alternatively, also the switches 19 and 20 could be closed in the case of opened switch 21. The difference between these two illustrated alternatives is that the first resistor 1 is, in the one instance, connected with the reference potential via an offset resistor 7 and, in the other instance, via the shunt resistor 5. In principle a connection with the reference potential without one of the resistors 5 or 7 would suffice for functioning of the circuit. Nevertheless, the known resistance value of the offset resistor 7, respectively the shunt resistor 5, offers the advantage that the measurement current $I_m$ from the second electrical current source 9 is thereby measurable in that a first offset voltage $U_{O,1}$ falls across the offset resistor 7, respectively a voltage $U_{r,5}$ falls across the shunt resistor 5. The offset voltage $I_{O,1}$ as well as the subsequently described offset voltages $U_{O,2}$ to $U_{O,4}$ falling across the offset resistor 7 during further measuring phasest $t_{r,2}$ to $t_{r,4}$ are so fed to the signal processing element shown here as amplifier 22 that these offset voltages $U_{O,1}$ to $U_{O,4}$ are subtracted from the voltages falling across the resistors 1 to 4 during the measuring phases $t_{r,1}$ to $t_{r,4}$. Thus, at least a first offset in the first voltage $U_{r,1}$ is corrected by means of the second offset voltage Uo and at least a second offset in the second voltage $U_{r,2}$ is, thus, corrected by means of the second offset voltage Uo. Usually, a difference amplifier instead of an operational amplifier is used for this purpose. The use of other signal processing elements provides options, which can be considered, such as, for example, the use of filters.

The separate offset resistor 7 offers, moreover, the advantage that, during the heating phase $t_h$, thus while the shunt resistor 5 is serving for measuring the heating current $I_h$, the measurement current $I_m$ of the second electrical current source 9 is still measurable. The measuring signals, thus the different offset voltages $U_{O,1}$ to $U_{O,4}$, can, moreover, be used for diagnosing the circuit. Thus, for example, a line break to one of the resistors 1 to 4 can be detected. If, in contrast, the shunt resistor 5 is utilized for measuring the measurement electrical current, the offset resistor 7 can be cost effectively embodied. It then does not need to be a precision resistor.

During a second measuring phase $t_{r,2}$, thus, in a third switch position, the second resistor 2 is connected in series with the second electrical current source 9, wherein the constant measurement current $I_m$ of the second electrical current source 9 flows through a second resistor 2 and wherein a second voltage $U_{r,2}$ falls across the second resistor. In this regard, in comparison to the second switch position during the first measuring phase $t_{r,1}$, the second switch 11 is open and the third switch 12 closed. Furthermore, the ninth switch 18 is closed and the tenth switch 19 open. The first switch 10 and the sixth switch 15 are back in the positions illustrated with the solid lines, such as in the first switch position. Also, switch 20 is closed again for heating current measurement. Theoretically, also during the heating phase $t_h$ with closed switch 19, the voltage falling across the first resistor 1 could be measured. However, the earlier described measuring of the first voltage $U_{r,1}$ is advantageous.

The third switch position differs, thus, from the first switch position shown in FIG. 1 by the fact that supplementally the third, the ninth and the twelfth switches 12, 18 and 21 are closed.

The flow of the measured medium through the measuring tube could be calculated based on the first voltage $U_{r,1}$, the second voltage $U_{r,2}$ and the fifth voltage $U_{r,5}$. The flow Q is calculated e.g. from the quotient of the heating power $P_h$ and the difference between the temperatures of the heated, first resistance 1 and the unheated, second resistance 2. The heating power $P_h$ results from the RMS value, thus the measured effective electrical current value of the total electrical current $I_1$ to the first resistor 1 and the resistance value of the first resistance, i.e. $P=I_1{}^2*R_1$. Effective electrical current value of the total electrical current $I_1$ is composed, in such case, of the heating current $I_h$, represented by the fifth voltage $U_{h,5}$, and the measurement current $I_m$, represented by the first offset voltage $U_{O,1}$. The temperatures of the first and second resistors 1 and 2 is learned from the resistance values of the first and second resistors 1 and 2, which result, in turn, from the first voltage $U_{r,1}$, the second voltage $U_{r,2}$ and the first offset voltage $U_{O,1}$ and the second offset voltage $U_{O2}$. An advantage compared to the state of the art is, on the one hand, the ascertaining of the heating power from the measured electrical current values and, on the other hand, at the same time, taking the measurement current into consideration.

In fourth and fifth switch positions, the first and second calibration resistors are connected in series with the second electrical current source, wherein, during a third measuring phase, measurement time $t_{r,3}$, the constant measurement current $I_m$ of the second electrical current source flows through the first calibration resistor 3, wherein a third voltage $U_{r,3}$ falls across the first calibration resistor 3, and wherein, during the fourth measuring phase $t_{r,4}$, the constant measurement current $I_m$ of the second electrical current source flows through the second calibration resistor 4, wherein a fourth voltage $U_{r,4}$ falls across the second calibration resistor 4. Besides the two calibration resistors 3 and 4, other calibration resistors can be provided, in order, in the case of non-linearity, to have more data points for the calibration and therewith to be able to increase the accuracy of measurement.

The fourth switch position differs from the first switch position by the features that, supplementally, the fourth, the eighth and the twelfth switches 13, 17 and 21 are closed. The fifth switch position differs from the first switch position by the features that, supplementally, the fifth, the seventh and the twelfth switches 14, 16 and 21 are closed.

The calibration resistors 3 and 4 are likewise highly precise and essentially temperature independent resistances. They correspond to the precision resistors in WO 2007/063111 A2 and serve the same function. Therefore, their function will not be explored further here, except to say that the measured resistance values are normalized with the measured resistance values of the calibration resistors 3 and 4. The entire disclosure of WO 2007/063111 A2 as regards the precision resistors is incorporated herein. The calibration resistors 3 and 4 are arranged close together in the same housing and so are subject to the same temperature fluctuations.

As can be gathered from FIG. 2, the heating phase $t_h$ is longer than each of the measuring phases $t_{r,1}$ to $t_{r,4}$, indeed it is much longer, e.g. ten time longer. The measuring phases $t_{r,1}$ to $t_{r,4}$ during a measuring cycle are essentially all equally long. Also, the measurement current $I_m$ during a measuring cycle is constant. The measuring phases $t_{r,1}$ to $t_{r,4}$ are short, especially very short, in comparison to the duration of the measuring cycle $t_M$. They can vary over a number of measuring cycles.

If two measuring cycles following one after the other are considered, the ratio $t_h/t_{r,1}$ of the length of the heating phase $t_h$ to the length of the first measuring phase $t_{r,1}$ over at least two measuring cycles following one after the other is constant and greater than 1, and the ratio $t_h/t_{r,2}$ of the length of the heating phase $t_h$ to the length of the second measuring phase $t_{r,2}$ over at least two measuring cycles following one after the other is constant and greater than 1.

Figure 4:
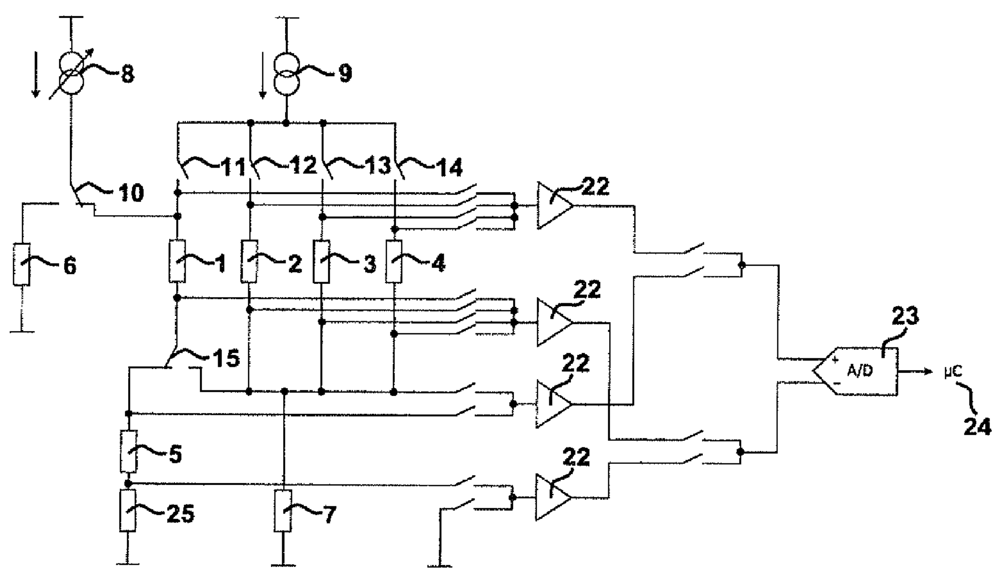
FIG. 4 is an additional alternative circuit diagram of a thermal, flow measuring device of the invention.
Figure 5:
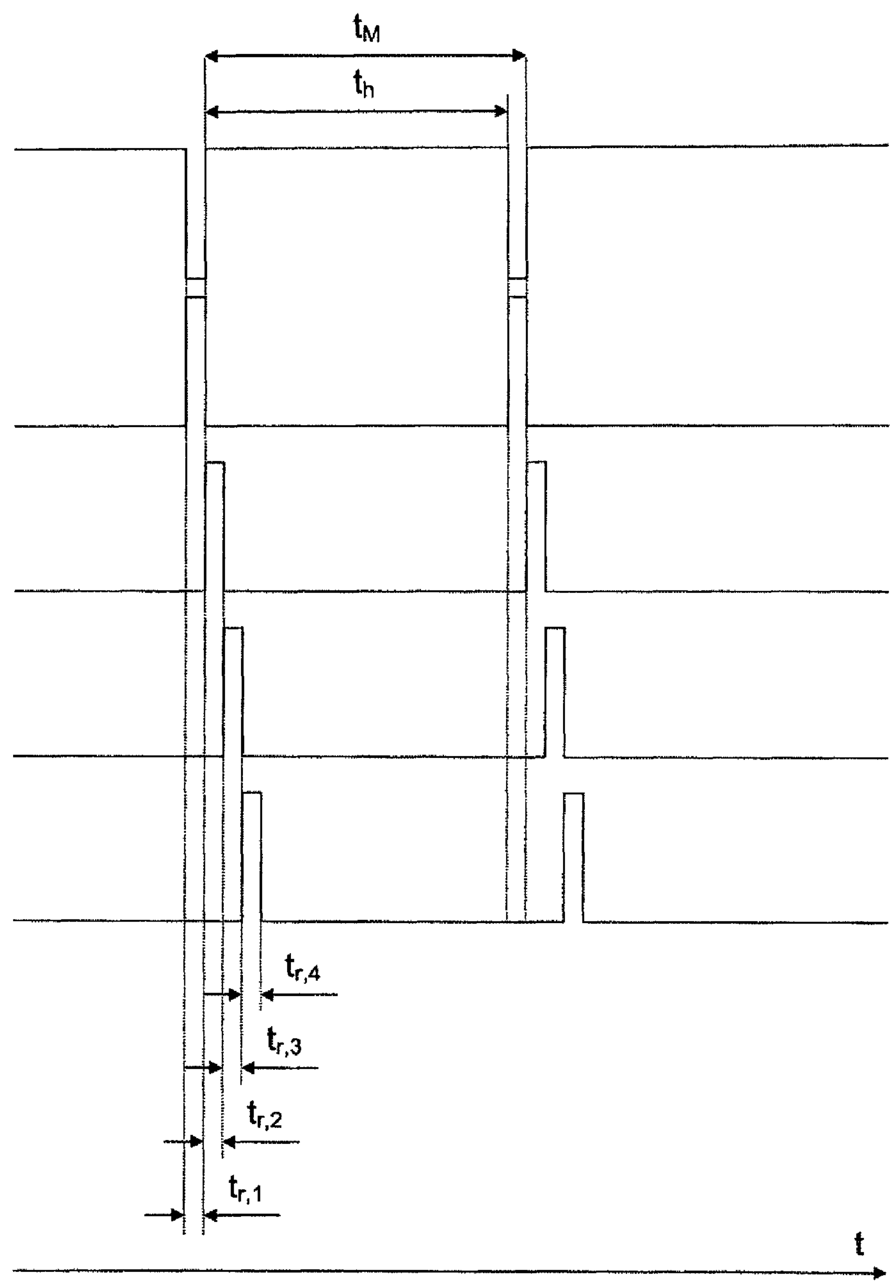
FIG. 5 is an alternative timing diagram illustrating the method of the invention.

The construction of the circuit can also be varied, especially as regards the arrangement of the switches to the resistors. The invention should not be limited to the illustrated embodiment. Thus, for example, the voltages can be measured at locations other than across the resistors. The method is performed advantageously in one measuring cycle. The measuring phases can, however, also occur individually, in each case, after a heating phase, such as shown in FIG. 4 of WO 2007/063111 A2. The sequence of the individual measuring phases shown here is likewise not absolute. Thus, the measuring phases to $t_{r,1}$ $t_{r,4}$ could sequentially follow one after the other, such as shown in FIG. 5.

Figure 3:
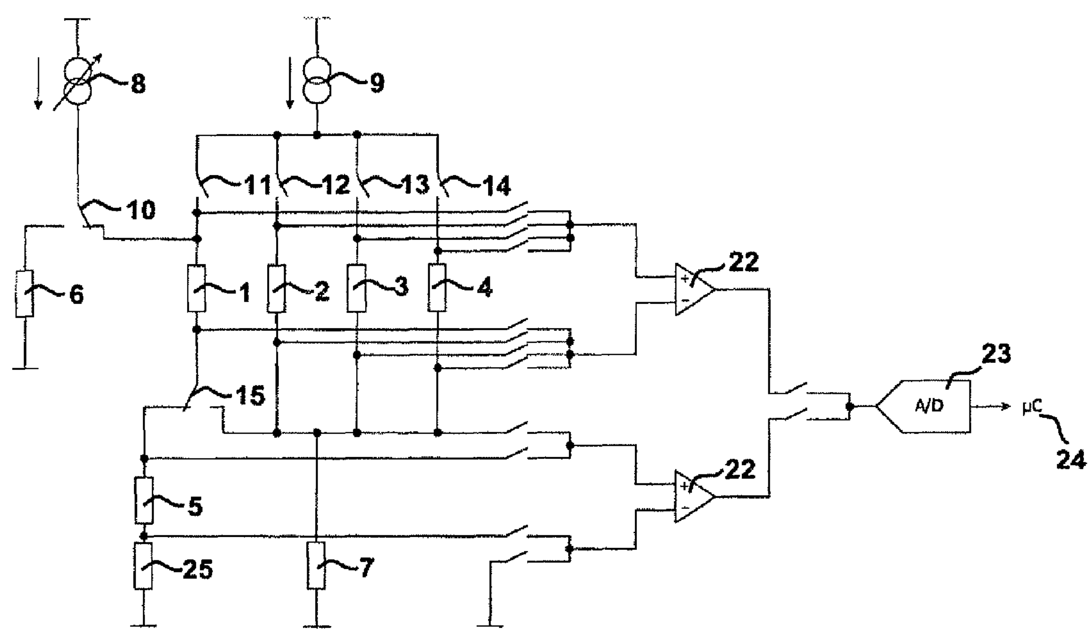
FIG. 3 is an alternative circuit diagram of a thermal, flow measuring device of the invention.

FIG. 3 shows an alternative embodiment of the invention. In such case, the resistance values are registered with a so-called four conductor measurement. The advantage is increased accuracy of measurement in comparison to the form of embodiment in FIG. 1. The signal paths in the case of the four conductor measurement, thus here between the taps directly on the in- and outputs of the respective resistors 1, 2, 3, 4 and 5 and the inputs of the amplifiers 22 are very high resistance in comparison to conventional signal paths. In this way, practically no electrical current flows. A voltage drop across a conventional switch, such as e.g. across the switches 16 to 21 of FIG. 1, degrades the measuring. In the case of the four conductor measurement, practically no voltage falls across the switches in the above described signal path between the resistors 1 to 5 and the amplifiers 22, whereby the accuracy of measurement is increased.

In the illustrated embodiment, the presence of the offset resistor 7 is essential for improving the accuracy of measurement in comparison to the form of embodiment of the invention illustrated in FIG. 1. Without the offset resistor 7, the accuracy of measurement would suffer. If, however, the amplifiers 22 are operated bipolarly, then, in turn, the offset resistor 7 can be omitted.

In the described embodiment, two, series connected, shunt resistors 5 and 25 are provided. The voltage falling across the first shunt resistor 5 is differentially measured. The second shunt resistor 25 has especially an essentially smaller resistance than the first shunt resistor 5. The temperatures of the first and second resistors 1 and 2 are proportional to the resistance values of the first and second resistors 1 and 2, which, in turn, result from the first voltage $U_{r,1}$ and the second voltage $U_{r,2}$. Because of the differential measuring, the values of the first offset voltage $U_{O,1}$ and the second offset voltage $U_{O,2}$ are here no longer of concern for temperature determination, compared with the embodiment of the invention shown in FIG. 1.

The circuit of FIG. 4 has, in comparison to the circuit of FIG. 3, four amplifier elements instead of two differential amplifiers, plus it has an A/D converter with differential input. In FIGS. 3 and 4, no evaluation of the voltage drops across the resistors is possible, since the switches to the signal processing elements are open. Based on the description of the circuit of FIG. 1, the operation of this circuit will be clear to those skilled in the art.

The invention claimed is:

1. A thermal, flow measuring device for measuring the flow of a measured medium through a measuring tube, comprising:

a first electrical current source;

a second electrical current source;

an electrical circuit, which has a first resistor and a second resistor, each of which is arranged in a housing bordering the lumen of the measuring tube, and at least one switch, which is switchable such that, in a first switch position, said first resistor is connected in series with said first electrical current source, in a second switch position, said first resistor is connected in series with said second electrical current source, and, in a third switch position, said second resistor is connected in series with said second electrical current source, wherein:

in said first switch position, a shunt resistor is connected in series with said first resistor and with said first electrical current source for measuring a voltage drop across said shunt resistor, and in said second switch position, a bypass resistor is connected in series with said first electrical current source such that with switching between said first switch position and said second switch position said first electrical current source experiences similar resistances and therefore no significant load jumps.

2. The thermal, flow measuring device as claimed in claim 1, wherein:

in the second switch position, an offset resistor is connected in series with said first resistor and with said second electrical current source; and in the third switch position, said offset resistor is connected in series with said second resistor and with said second electrical current source.

3. The thermal, flow measuring device as claimed in claim 1, wherein:

at least said first electrical current source is a software controlled, electrical current source.

4. The thermal, flow measuring device as claimed in claim 1, wherein:

at least one amplifier, an A/D converter and a microcontroller are provided in the circuit for additional signal processing.

5. A method utilizing an electrical circuit for measuring flow of a measured medium through a measuring tube, comprising the steps of:

during a heating phase of predetermined length during a first measuring cycle, a constant heating current of a first electrical current source flows through a first resistor, which first resistor is exposed to the measured medium;

during a first measuring phase of predetermined length during the first measuring cycle, a constant measurement current of a second electrical current source flows through the first resistor;

during the first measuring phase, a first voltage falls across the first resistor;

during a second measuring phase of predetermined length during the first measuring cycle, the constant measurement current of the second electrical current source flows through a second resistor, which second resistor is exposed to the measured medium;

during the second measuring phase, a second voltage falls across the second resistor;

during the heating phase, the constant heating current of the first electrical current source flows through a shunt resistor;

during the heating phase, a shunt voltage falls across the shunt resistor; and during the first measuring phase, the constant heating current of the first electrical current source flows through a bypass resistor, wherein:

at least the first voltage, the second voltage and the shunt voltage are utilized for calculating the flow.

6. The method as claimed in claim 5, wherein:

during said first measuring phase, the constant measurement current of said second electrical current source flows through an offset resistor, wherein:

during the first measuring phase, a first offset voltage falls across the offset resistor;

during the second measuring phase, the constant measurement current of the second electrical current source flows through the offset resistor;

during the second measuring phase, a second offset voltage falls across the offset resistor;

the first offset voltage and the second offset voltage are utilized for calculating the flow; and the first offset voltage and the second offset voltage serve for diagnosing the electrical circuit.

7. The method as claimed in claim 5, wherein:

the ratio of the length of the heating phase to the length of the first measuring phase is held constant and greater than 1 throughout at least two measuring cycles; and the ratio of the length of the heating phase to the length of the second measuring phase is held constant and greater than 1 throughout at least two measuring cycles.

8. The method as claimed in claim 5, wherein:

said first measuring phase follows directly after the heating phase.

* * * * *